INVENTOR.
DONALD J. WEBER.
BY
Warren H. F. Schmieding
HIS ATTORNEY

INVENTOR.
DONALD J. WEBER
BY
Warren H. F. Schmieding
HIS ATTORNEY

June 27, 1950 D. J. WEBER 2,512,844
MACHINE FOR EXTRUDING PLASTIC TUBES
Filed June 30, 1947 4 Sheets-Sheet 4

INVENTOR.
DONALD J. WEBER
BY
Warren H. F. Schmieding
HIS ATTORNEY

Patented June 27, 1950

2,512,844

UNITED STATES PATENT OFFICE 2,512,844

MACHINE FOR EXTRUDING PLASTIC TUBES

Donald J. Weber, Richwood, Ohio, assignor to Yardley Plastics Company, Columbus, Ohio, a corporation of Ohio Application June 30, 1947, Serial No. 758,169

9 Claims. (Cl. 18—14)

The invention disclosed in this application relates to apparatus for extruding plastic materials. The devices disclosed in illustration of the invention comprise generally means for extruding plastic material under pressure in a rough tubular shape, means for supplying a protecting film of lubricant under pressure around the rough tubular shape so extruded, and means and apparatus for supplying air under pressure to the interior of said plastic shape to force it together with the protecting film of lubricant toward the sides of an accurate cooling die tube and to maintain the film in contact with the die and the plastic in contact with the film so as to form accurately both the inside and outside diameter of plastic tubing. The devices disclosed usually include also controllable apparatus for drawing the plastic tubing from the cooling die tube at variable rates of speed in order to control the thickness of the tubing formed thereby. In the embodiments disclosed there are shown different means for at times automatically augmenting the pressure and/or supply of lubricant. Although I prefer to use oil as a lubricant any other suitable lubricant may be used and where I use the term oil herein, it should be construed as lubricant broadly.

Prior hereto apparatus has been proposed intended to extrude plastic rod and other solid shapes of plastic to relatively accurate dimensions. Apparatus has also been proposed intended to extrude hollow plastic tubing. However, in all of the prior art proposals, of which I am aware, intended to extrude hollow tubing as distinguished from rod, it has been found impossible to control the dimensions of the extruded tubing as accurately as they should be controlled for the tolerances necessary and desirable in such tubing.

A further object of the invention is the provision of apparatus for extruding plastic tubing and other hollow shapes of plastic accurate to extremely close tolerances both as to inside and outside dimensions.

A further object of the invention is the provision of apparatus for extruding accurate dimension plastic tubing and other hollow shapes of plastic, including means for controllably varying the wall thicknesses of such tubing.

A further object of the invention is the provision of and apparatus for extruding plastic tubing and other hollow shapes of plastic having accurate dimensions including means for extruding the plastic itself under pressure, means for supplying air or gas under pressure to the interior of the hollow shape being extruded so as to force the plastic outward toward contact with the walls of a cooling and forming die, and means for supplying a thin film of lubricant under pressure for maintaining the plastic being extruded out of actual contact with the die although the plastic is held so close to the die that it is accurately shaped thereby, all being so arranged that the pressure of the lubricant, the pressure of the plastic, and the air pressure on the inside of the plastic all become balanced while in the die.

Features of the invention include the provision of an off-set delivery block by means of which plastic is delivered from the barrel of the extruder to the straight line assembly of air supply tube, main die, spider, mandrel, nozzle, oil ring, and cooling die; means for adjusting the nozzle to predetermine accurately the initial shape of the outside of the hollow plastic being formed; an air retaining mechanism (positioned within the hollow plastic being formed) having a handle which extends forwardly through the hollow plastic and thus maintains the air pressure within the hollow plastic being formed; a coupling or elbow through which air is introduced into the air tube and which has a removable cap so that, if desired, a retaining wire for an air retaining mechanism may extend therethrough and so that a cleaning tool may be inserted through the air tube in order to clean out plastic in case of jams, etc.; an oil ring provided with a two diameter bore setting over a sleeve of the nozzle so that a small annular passageway for oil under pressure is provided for delivering oil around the plastic tube as it emerges into the cooling die; and a spider having a mandrel secured thereto, both the spider and the mandrel being formed with a central air bore.

Further objects, features and advantages of the present invention will be apparent from the following description, reference being had to the accompanying drawings wherein a preferred form of embodiment of the invention is clearly shown.

The inventions disclosed are of particular utility for the purpose of extruding plastic tubings to tolerances approaching, equalling, or bettering those used in manufacturing metal tubing. Accordingly, although the inventions are not limited to the manufacture of tubing, the illustration of the inventions will relate to the manufacture of such tubing. By means of my inventions a piece of plastic tubing may be extruded which is fully hardened before it leaves the dies, thus eliminating variations which might be caused by uneven cooling and by differing viscosities in the extruded material.

Figure 1:
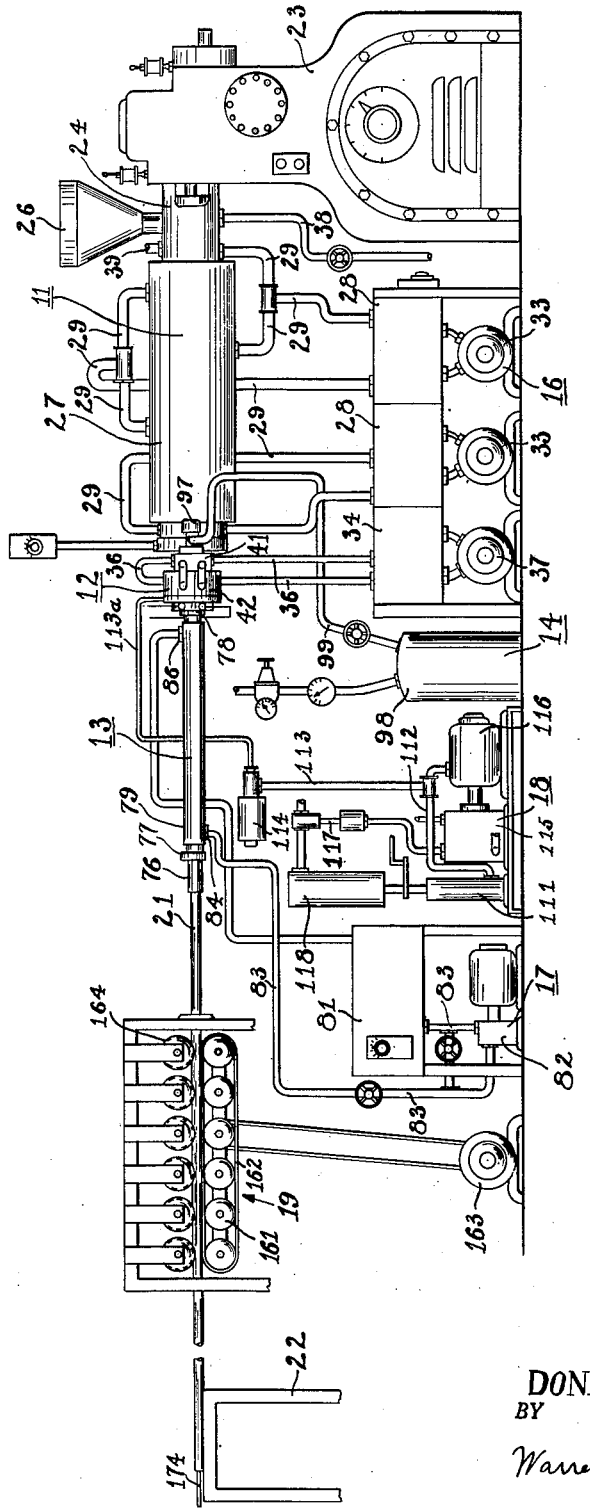
Fig. 1 is a view mainly in side elevation but with some parts shown diagrammatically illustrating an extruding apparatus constructed in accordance with my invention.

In general the apparatus disclosed (see Fig. 1) comprises a plastic extruder 11, an initial die assembly 12, a cooling die assembly 13, means 14 for supplying air under pressure, means 16 for heating the plastic, means 17 for cooling the cooling die assembly and the plastic therein, means 18 for supplying lubricant under pressure and a variable speed caterpillar-type roller conveyor 19. The tubing 21 which is being formed may be delivered to a table 22, or to any convenient receptacle.

The extruder 11 may be of any convenient type. For instance, it may be a commercial type of extruder as is shown or it may be of any special type of extruder desired.

The extruder 11 as shown comprises an electric motor and reducing gear unit 23, a feeder 24, a hopper 26 and an extruder barrel 27. The plastic is heated in the barrel 27 by hot oil circulated from tanks 28 through the pipes 29 and through the jacket of barrel 27 by pumps driven by motors 33. The heat is maintained in the die assembly 12 by heated oil circulated from tank 34 through pipes 36 by a pump driven by a motor 37.

Provision is made to prevent, so far as is possible, heat from the barrel 27 and from the plastic contained therein from being conducted to the motor and gear unit 23. This is accomplished by circulating cooling water through a jacket surrounding the feeder 24, the water entering by an inlet water pipe 38 and leaving by an outlet water pipe 39. Suitable thermostats and indicators are provided for controlling the temperature of the plastic as it is extruded from the barrel 27.

Figure 2:
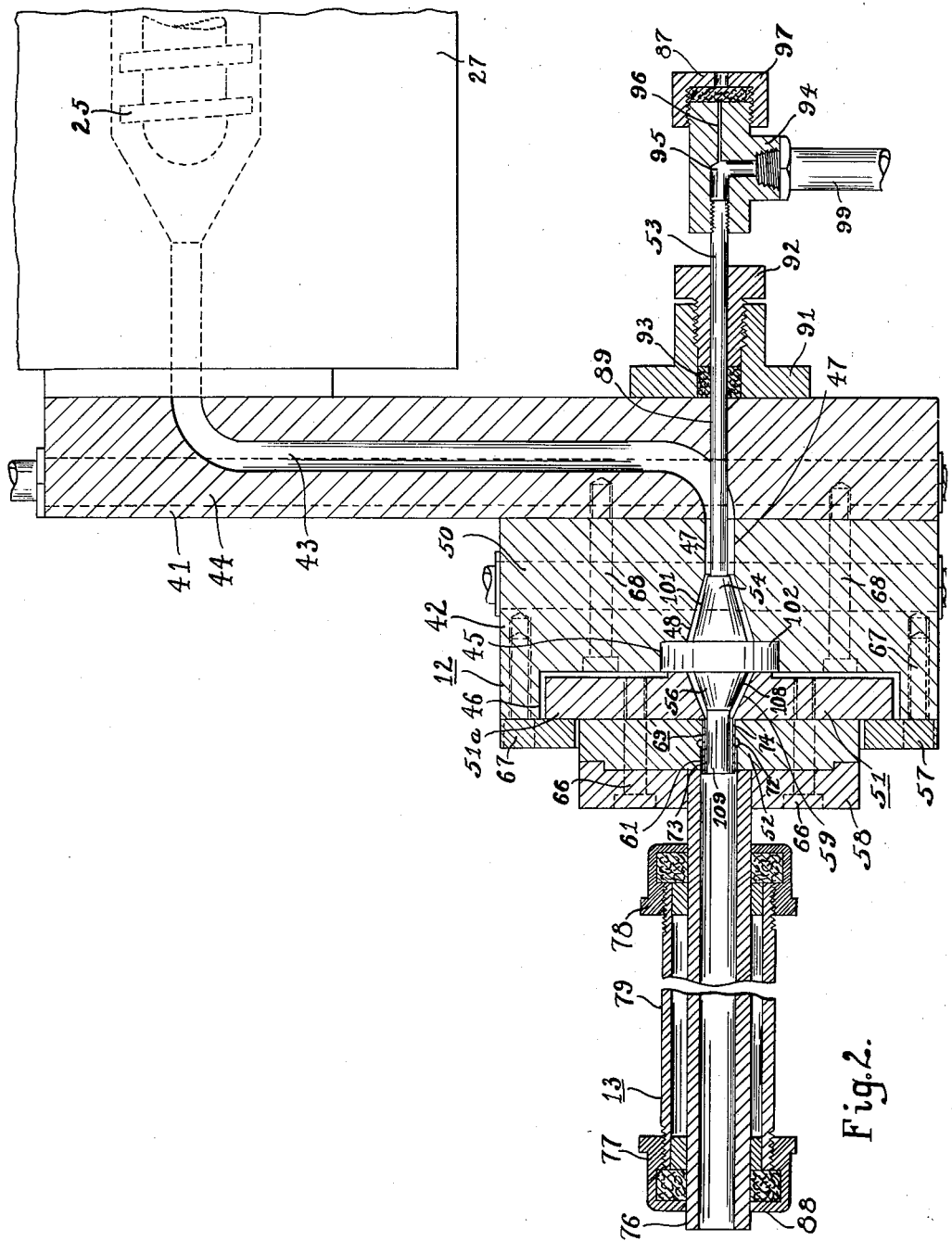
Fig. 2 is a fragmentary view in horizontal section and on a much larger scale than Fig. 1 showing the dies, mandrel, nozzle, oil ring, and portions of the cooling die.

I provide especially designed means comprising the initial die assembly 12 for initially shaping the plastic tube. An off-set delivery block 41 (see Figs. 2 and 3) is provided for the purpose of delivering plastic from the barrel 27 of extruder 11 to the central passage in a main die block 42. So long as it accomplishes this purpose, it may be of any convenient form. However, I prefer to use a delivery block such as is shown at 41 substantially in the form there shown. In the block 41 there is formed an S-shaped passage 43 and there are also provided passages 44 for the circulation of heating fluid. The main die block 42 also may be of any convenient shape but I prefer to form it as shown. The block 42 is formed at its forward end with a relatively small recess 45 and with a larger recess 46 and is also formed with a substantially central bore 47 aligned and cooperating at the rear end of the block with the outlet end of the bore 43 of the delivery block 41. The bore 47 is gradually enlarged as at 48 to form a frusto conical portion thereof which merges into the recess 45. The main die block 42 (like the delivery block 41) is formed with heating passages 50. The heated plastic coming from the extruder barrel 27 is further heated (if necessary) while in the delivery block 41 and in main die block 42 (or is maintained at the proper temperature) by hot oil circulated from tank 34 through pipes 36 and passages 44 and 50 by a pump driven by motor 37.

The initial die assembly 12 includes in addition to the delivery block 41 and the main die block 42, a nozzle 51 including a nozzle block 51a, an oil ring 52, an air inlet tube 53, a spider 54, a mandrel 56 and retainer ring 57 and retainer plate 58, retainer plate 58 being welded as a flange on the cooling tube 76.

The nozzle 51 shown is designed for the manufacture of ⅝" tubing. It is positioned within the recess 46 and is formed as at 59 with a frusto conical bore which as shown flares in the opposite direction to that of the bore 48. However, the bore 59 may be cylindrical or may flare outwardly (i. e. in the same direction as the flaring of the bore 48) for the manufacture of larger sizes of tubing than produced by the embodiment shown. The nozzle 51 carries a tubular projection or sleeve 61 which projects partly through the oil retaining ring 52 and forms the last metallic contact for the outside of the plastic tube as it is being extruded into the cooling die 13. The nozzle block 51a is somewhat smaller in diameter than recess 46 and the concentricity of the nozzle 51, with respect to the mandrel 56, is effected by six screws such as are shown at 64.

The parts 41, 42, 51 and 52 are fastened securely to each other. For this purpose, I provide bolts such as 66, 67 and 68. The bolts 66 pass through the plate 58, the ring 52 and into the nozzle block 51a; the bolts 67 pass through the retaining ring 57 and into the main die block 42; and the bolts 68 pass through the main die block 42 and into the delivery block 41. The mandrel 56 (as will be more fully described hereafter) is secured in and extends through the bore 59 of the nozzle 51, through the tubular projection 61 thereof and at its forward end extends slightly into the cooling die 13.

Figure 3:
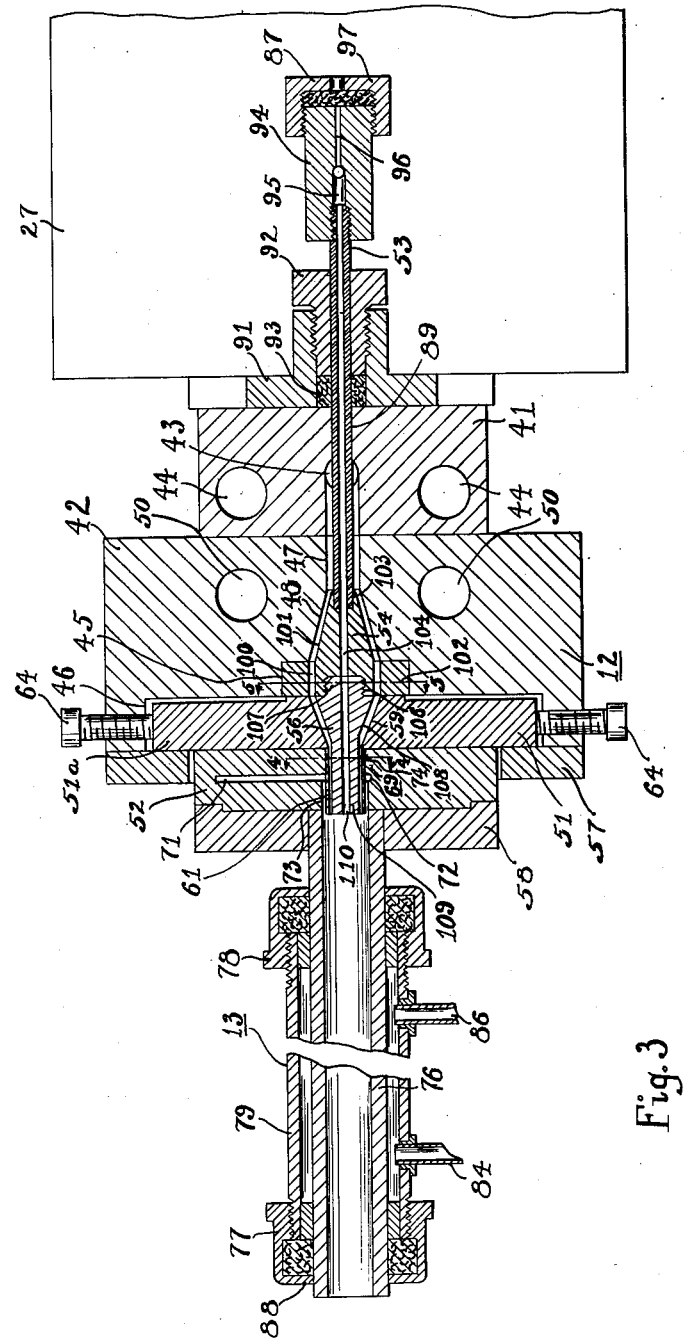
Fig. 3 is a fragmentary view in vertical sec-
Figure 4:
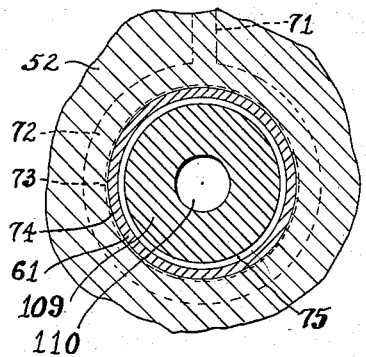
Fig. 4 is a fragmentary view in vertical section and on a still more enlarged scale (approximately three times that of Fig. 3) taken substantially on the line 4—4 of Fig. 3.

The ring 52 may be of any convenient form but preferably is formed with a central opening 69 to be further described below. The sleeve 61 extends through this opening 69. The ring 52 is (as shown in Fig. 3) formed with an oil inlet passage 71. When it is to be used in the manufacture of small tubing, I prefer to form it with an oil groove 72 but when manufacturing larger tubing, the oil groove is not necessary and it may be omitted even in forming smaller tubing. The opening 69 in oil ring 52 is formed with two diameters. That is, the portion 73 (Figs. 3 and 4) ahead of the oil groove 72 has an internal diameter slightly larger than the portion 74 (Figs. 3 and 4) rearward of the groove 72. The smaller diameter portion 74 fits snugly on the nozzle projection 61. The larger diameter portion 73 is thus spaced slightly from the nozzle projection 61 so that an annular space 75 is formed. The oil inlet passage 71 supplies thereto a film of oil which is moved forward through the annular space 75 between the nozzle projection 61 and the large diameter portion 73 of the oil ring 69. This film of oil emerges from the space 75 to surround the tube of plastic as it emerges from the nozzle projection 61.

The cooling die assembly 13 also may be of any suitable form. However, I prefer that it comprise a seamless steel tube 76 having an internal diameter accurately formed to correspond to a diameter slightly larger than the outside diameter of the plastic tube being formed. The amount of this difference depends on the kind of plastic material used and on the size of the tubing. For instance, with certain types of plastic and for tubing having an outside diameter of 5/8", I use a cooling tube having a diameter .010 larger than the outside diameter of the tubing being formed. The cooling die may be of any convenient length but I prefer to have it approximately 24" to 36" long, it being possible by the use of a cooling die tube of that length to accurately and quickly cool plastic tubing so that a relatively speedy production is obtained and so that it is possible to eliminate sticking of the plastic as it is being formed. Each end of the tube is provided with a stuffing box such as are shown at 77 and 78. Concentrically surrounding the tube 76 is a larger tube 79 which together with stuffing boxes 77 and 78 forms a cooling jacket within which a cooling fluid such as water is circulated. The cooling fluid is initially warmed by a heater 81, and pumped by pump 82 through pipes 83 so that it flows through the cooling jacket from the cooling inlet 84 to the cooling outlet 86, thus acquiring heat as it travels toward the hotter plastic.

The means for supplying air under pressure to the air inlet tube 53 may also be of any convenient form. However, I prefer that this air supply shall be so arranged that a straight line passage extends without obstruction from the rear of the apparatus as at 87 through the forward end of the cooling die as at 88. To this end I prefer that the air tube 53 itself shall extend through a bore 89 aligned with the bore 47 and through the bore 47 itself, and be welded into the rear end of the spider 54. If desired, however, the air tube 53 could be threaded into the rear end of the spider 54. As shown, the tube 53 is secured to the delivery block 41 by a tubular fitting 91, nut 92 and packing gland 93. To the rear end of the tube 53, I prefer to secure a T-shaped elbow 94 having the main passage 95 in the form of an L and having a supplementary reduced passage 96 extending rearwardly. This rearward passage 96 is normally closed by a cap 97. A suitable source of air supply comprising a tank 98 is connected by a conduit 99 to the passage 95 and thus the inlet tube 53.

Figure 5:
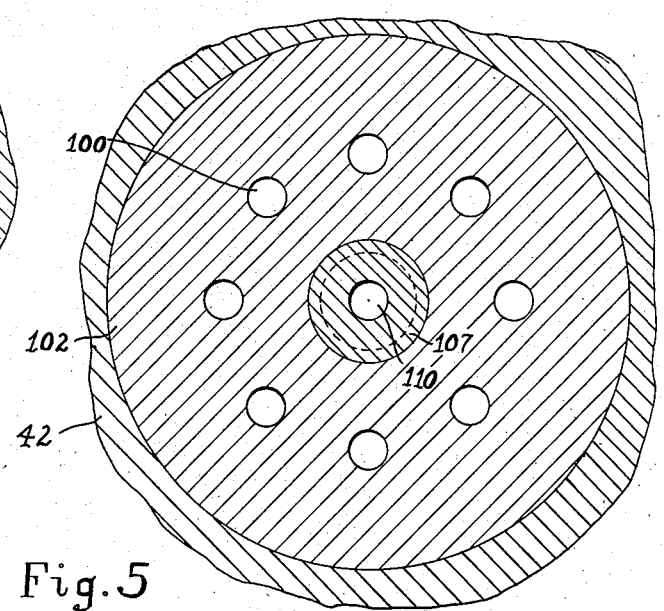
Fig. 5 is a fragmentary view in vertical section and on an enlarged scale, comparable to that of Fig. 4, taken substantially on the line 5—5 of Fig. 3.

The spider 54, as is shown in Figs. 3 and 5, is formed with a plurality of openings 100 through which plastic flows as it moves into the nozzle 51. The spider flares outwardly as at 101 (Figs. 2 and 3) and is provided with an enlarged head 102 by which it is positioned and securely held in the recess 45 of the main die block 42. Rearwardly of enlarged portion 102, the spider 54 as stated above is tapered as at 101 until at its rearward end it conforms substantially in size to the size of the air tube 53 which is secured in the rear end of the spider 54. The spider is centrally bored as at 104 for the passage of air forwardly therethrough. It is also centrally bored and tapped at its forward base as at 106 for the reception of a threaded extension 107 formed on the rear of the mandrel 56.

By securing the extension 107 within the tapped bore 106, the mandrel 56 is securely fastened and positioned by the spider 54 which is itself securely fastened, positioned and held within the main block 42 by its enlarged head 102. The mandrel 56 is tapered forwardly as at 108 in substantially parallel relation to the tapered bore 59 of the nozzle 51 so that there is an accurate annular space, between the bore 59 and the tapered portion 108 of the mandrel, 56 for the passage of an accurate amount of plastic in tubular shape for the formation of the plastic tubing desired.

Where larger tubing is to be formed, the portion 108 conforms to the shape of the bore 59 and thus may be either cylindrical or even flare outwardly so that a parallel relationship is maintained with the bore 59 when as described above the bore 59 is cylindrical or outwardly flaring. Forwardly of the tapered portion 108, the mandrel 56 has a cylindrical portion 109 which initially forms the inner surface and initially determines the inner diameter of the plastic tube being formed. The mandrel 56 is also formed with a central bore 110 which registers with the central bore 104 of the spider 54 and allows the passage of air forwardly to within the center of the plastic tube being formed at the point at which the plastic enters the cooling die tube 76. The cylindrical portion 109 is spaced inwardly from the tubular extension 61 of the nozzle 51, a distance substantially sufficient to maintain the proper thickness of the plastic tube being formed as it is extruded through the annular passage between such forward tubular projection 61 and the cylindrical portion 109. It must be understood that oil coming in through the passage 71 surrounds the tubular extension 61 of the nozzle 51 and as the plastic passes forward from around the cylindrical portion 109, it picks up and carries with it a film of oil on the outer surface thereof. As the plastic tubing passes into the cooling die tube 76, it bends outward and is pressed towards the sides of the cooling tube by the compressed air coming out from the passage 110 and except for the film of oil surrounding it would contact with the sides of the tube 76. A little triangular pocket of lubricant is formed just outside of the bend of the plastic tube. The flowing plastic and its film of oil slides on this pocket as it bends out into contact with the tube 76. The plastic slides forward on the film of oil in the tube 76 and thus the tube 76 accurately determines the outer diameter of the plastic tube being formed.

The relative rate of movement of the plastic tube being drawn from the cooling tube by the conveyor 19 and the rate of flow of the plastic being driven by the extruder 11 through the annular passage surrounding the cylindrical extension 109 determines the thickness of the wall of the plastic tube being formed. At the same time, the air, under pressure inside of the plastic tube, forms a smooth inner surface on the plastic tube being formed. Adjustment of the nozzle 51 by means of the bolts 64 moves the tubular projection 61 relative to the cylindrical portion 109 and thus I may compensate for any initial unevenness in the thickness of the walls.

The means for supplying lubricant under pressure during normal operations and for supplying lubricant under high pressure automatically when needed may be of any desired form. However, I have shown in Figs. 1, 7 and 8 two forms of apparatus for this purpose either of which are entirely satisfactory for use in supplying lubricant under the relatively low pressures used in normal operation and for the automatic supply of lubricant under extremely high pressures in case of jams or of threatened jams of the plastic within the oil ring 52 or within the cooling die 13. The apparatus shown in Fig. 1 comprises an accumulator 111, conduits 112, and 113 leading therefrom, a throttle valve 114 connected to conduit 113, and a conduit 113a leading from the throttle valve 114 and connecting with the oil passage 71 of the oil retaining ring 52. The accumulator 111 is designed to supply oil under uniform pressure of 6500 lbs. per square inch (6500 p. s. i.) and the throttle valve 114 is designed to reduce the flow from said accumulator to an accurate rate of the order of nine drops per minute as may be desired. A piston type air motor 115 and a liquid pump 116 driven thereby cooperate with a conduit 117, to an air tank 118 to maintain a uniform pressure (6500 p. s. i.) on the lubricant in accumulator 111.

The rate or amount of flow may be adjusted and accurately controlled by the throttle valve 114 regardless of the unusually high pressures developed by my accumulator 111. It may be pointed out here that my accumulator, which is described in detail and claimed in my copending application Serial No. 758,168, filed June 30, 1947, controls the pressures on the lubricant accurately without the variations usually encountered with accumulators developing such high pressures. Without accurate and uniform pressures in accumulator 111, it would be impossible to accurately control the rate of flow of lubricant and would be impossible to accurately control the dimensions of the tubing extruded to the close tolerances necessary.

In spite of the facts that the accumulator develops lubricant pressures of more than 6000 p. s. i. and that the extruder normally operates at about 3500 p. s. i. and may develop pressures of the same order as the lubricant pressures or even higher and in spite of the fact that the operating pressure of the air through passage 110 is only of the order 10-40 p. s. i. (normally 25-30 p. s. i.), yet these three pressures are normally balanced in the cooling die 13 at a pressure which corresponds to the operating pressure of the air. The rate of extrusion of the plastic is accurately controlled by the speed of the screw 25 in the barrel 27, and the rate of supply of lubricant is accurately controlled by the throttle valve 114 cooperating with my (accurate pressure) accumulator 111. By this arrangement I insure that the pressure of the lubricant and of the plastic drop to correspond to the relatively low pressure of the air. Thus I maintain production of plastic tubing having accurate inside and outside diameters, to very close tolerances.

Figure 7:
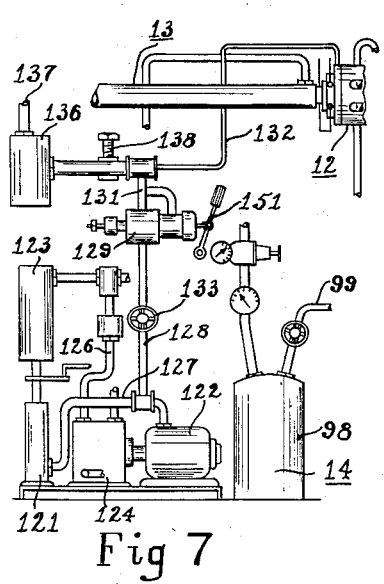
Fig. 7 is a fragmentary view mainly in side elevation but having some parts shown diagrammatically comparing in scale etc. to Fig. 1 and showing an alternate form of lubricant supplying means.
Figure 8:
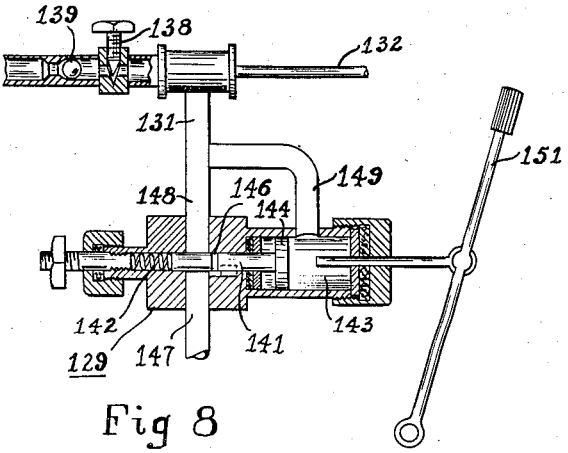
Fig. 8 is a fragmentary view of a portion of Fig. 7 shown partially in elevation, partially in section and partially diagrammatically.

In Fig. 7 I show another form of apparatus for the supply of lubricant under pressure at a controlled rate of flow for normal operation which is adapted to supply lubricant at a much higher pressure with much larger volumes when needed under abnormal situations as for example when it is necessary to break plastic jams in the cooling die 13 and adjacent thereto. In this embodiment, I use an accumulator 121 which may be exactly the same as the accumulator 111 and have similar pressure maintaining arrangement including an oil pump 122, an air tank 123, a piston type air motor 124 and air conduits such as are shown at 126. However, a much simpler form of high pressure accumulator may be substituted inasmuch as the source of high pressure lubricant is not used during normal operations but only in case of abnormal situations such as plastic jams, etc. Therefore the maintenance of exact pressures is not as necessary in the high pressure source. The accumulator 121 is connected by pipes 127 and 128 with a pressure control valve 129 and thence by conduits 131 and 132 with the lubricant passage 71 of the oil retaining ring 52. Interposed in the conduit 128 is a manually controlled valve 133. There is a low pressure lubricant tank 136 which is also connected to the conduit 132 through a conduit 134. The lubricant tank 136 has an air supply 137 which keeps the lubricant within said tank under a pressure of the order of 50 to 100 lbs. per square inch. Interposed in the conduit 134 is a reducing valve 138 which reduces the flow of lubricant from the tank 136 to an exact rate of flow (for example, 9 drops per minute for certain sizes of tubing and certain types of material). This valve, however, does not have to be as elaborate as the valve 114 shown in Fig. 1 because though its rate of flow must be controlled as accurately yet it is easier to do this with lubricant under lower pressure. Also, interposed in the conduit 134 (as is shown in Fig. 8) is a check valve 139. The details of the pressure control valve 129 are also shown more clearly in Fig. 8 where it may be seen that the plunger 141 is normally held in the position shown by a spring 142 but may be moved by lubricant pressure in chamber 143 acting on piston 144 so that the port 146 will register with the ports 147 and 148 to allow the passage of high pressure lubricant into the conduit 131 and thence through the conduit 132 to the oil passage 71 (Fig. 2), the oil groove 72 and the annular passage between the tubular projection 61 of the nozzle 51 and the large diameter portion 73 of the oil ring 52. Any other similar pressure control valve of which many are known in the prior art may be used if desired. A branch conduit 149 (Fig. 8) connects the conduit 131 with the chamber 143 so that pressure is built up in the chamber 143 whenever jams occur and so that a large volume of lubricant under high pressure is supplied instantly to eliminate such jams before they become too serious. Thus, inasmuch as the pressures in the tank 136 are higher than the normal operating air pressures (as stated above the oil pressures in the tank 136 should be about 50 p. s. i. or higher whereas the normal operating air pressures are 25 to 30 p. s. i.), as soon as a jam occurs, the pressures in the chamber 143 rapidly build up to a pressure necessary to compress the spring 142 (which may be set to operate at about 45 p. s. i.) and to move the piston 144 and the plunger 141 to a position which allows the passage of high pressure lubricant in large quantities to the source of the jam. As soon as the jam is removed by the high pressure lubricant, the pressures in the conduit 132 drop and the spring 142 restores the piston 141 to the position shown and normal operation is resumed. The valve 133 is provided for manually cutting off the high pressures if for any reason the spring 142 fails to return the piston automatically. The plunger 141 may be moved manually from the position shown to the position in which the port 146 is aligned with the ports 147 and 148 by means of the handle 151, should it be necessary or desirable to supply high pressure lubricant at any time other than when the valve 129 is operated automatically.

The conveyor 19 is a caterpillar type conveyor and comprises a series of operating rollers 161, and a series of idler rollers 164. The rollers 161 carry a belt 162, and are driven by a controllable variable speed motor 163. The finished tube 21 which is completely cooled and hardened when it emerges from the cooling die 13, rests upon the belt 162 and is held in position thereon by the idlers 164. Thus the conveyor 19 draws the finished tubing from the cooling die 13 at a controlled speed. The thickness of the walls of the plastic tubing being formed is accurately controlled by the relative speed at which the caterpillar conveyor 19 draws out the tubing as compared with the speed of the screw 25 which forces plastic from the extruder 11. Each of the rollers 161 and 164 has its peripheral edge curved to conform approximately to the shape of the tube being extruded. Inasmuch as the caterpillar conveyor 19 is controlled by the variable speed motor 163 the speed of which may be accurately controlled, the wall thickness of the plastic tube being formed, can be controlled exactly as desired.

Figure 6:
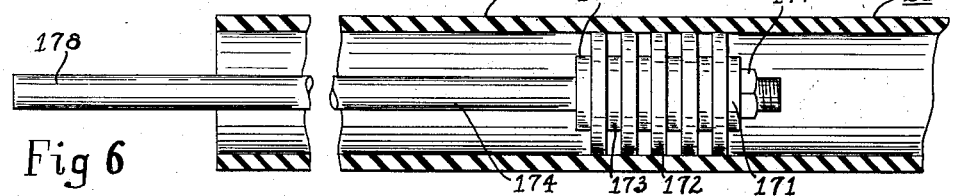
Fig. 6 is a view in vertical section of a portion of a plastic tubing after extrusion, showing an air retaining mechanism positioned within the tubing.

I provide means for sealing the air pressure within the tube being extruded. Any means suitable for this purpose may be used. However, I have disclosed one specific method thereof in Figs. 1 and 6. Within the plastic tube 21 which is being extruded from the cooling die 13, I insert a stopper member 171. The stopper member 171 comprises a series of cups or washers 172 separated by smaller diameter metallic washers such as 173 all held in place on a threaded rod 174 as by nuts 176 and 177. The rod 174 may be relatively quite long, the length thereof depending on the length of the sections of tubing being manufactured. The rod 174 will necessarily be slightly longer than the length of the individual sections of the tubing being formed. Thus the end 178 of the rod 174 extends outside of the outer end of the tubing being formed and the cups 172 and washers 173 are positioned inward of the point 179 at which the plastic tubing is to be cut off.

However, other means for sealing the air pressure within the tube being formed may be used if desired. For instance in smaller sizes of tubing I may maintain air pressure inside the tube by driving tapered plugs in the open end of the tubes to seal the air in. When the tubing has reached a suitable length it may be scored with a knife, broken, and another tapered plug driven in. If the cut-off operation is done fairly quickly, the temporary loss of air pressure inside the tube does no noticeable harm. Alternatively, I may use a stopper similar to the washer portion of the stopper 171 and connect it by a wire with the rear cap 97, the wire extending through the center of the tubing 21 not only where the tubing projects outside of the die 13 but also where the tubing traverses the die 13 and the wire then extending through the bores 110 and 104, through the air tube 53 and the bores 95 and 96.

One reason for having the off-set delivery block 41 is to have the air delivery tube 53 straight. This facilitates cleaning plastic from the air delivery tube should a jam occur and should plastic be driven therein. It also provides means as referred to above for sealing of air pressure within the tubing being formed from the rear.

In illustration of the method and apparatus of my invention, I will now describe the operation of the disclosed machine for the formation of plastic tubing of accurate size and dimensions and in which the tubing is fully hardened before it leaves the cooling die. This method and apparatus eliminate variations in the finished tubing caused by uneven cooling, variations in the tubing caused by the raising and falling of internal pressures, and variations caused by different viscosities in the extruded material.

The plastic material leaves the barrel 27 of the extruder 11, enters the offset delivery block 41, follows the milled bore 43 therein around the first and second curve and then flows around the air inlet tube 53 and up the tapered side of the spider 54. The material then passes through the holes 100 in the spider 54 and over the exterior of the mandrel 56. Then it passes through the annular space formed between the cylindrical portion 109 of the mandrel and the tubular extension 61 of the nozzle 51. In the meantime the lubricant under pressure supplied either by the accumulator 111 or the tank 136 is supplied through the cooperating conduits and passages including the conduit 113a or 132 and the passage 71 and into the oil groove 72. Thence the lubricant flows through the very narrow tubular passage between the larger diameter 73 of the oil ring 52 and the exterior of the tubular extension 61. The plastic coming through the tubular extension 61 meets the lubricant at the very edge of the extension 61 and the lubricant forms a film between the plastic and the cooling die tube 76. At the same time that the plastic meets the oil on the outside, it meets the air coming in through the center 110 of the mandrel 56. The air inside the tubing blows it out to the inner diameter of the cooling die tube 76. While the plastic tubing is sliding along the cooling tube on a thin film of oil it is cooled sufficiently to cause it to set or freeze up solidly. It then leaves the cooling tube and is fed through the caterpillar tractor roller conveyor 19. The purpose of this conveyor is to pull the tubing from the die at a rate of speed to give the proper wall thickness to the tubing. By speeding up the conveyor, a thinner wall results, because the plastic is stretched lengthwise. If the conveyor is slowed down a thicker wall results. An operator from time to time cuts the tubing as at 179 and then by means of the handle 174 pushes the stopper 171 rearwardly along the plastic tubing being formed until only the end 178 of the rod 174 projects from the end of the tubing. He then again cuts the tubing at a position corresponding to the position 179 and repeats the operation. To cut the tubing the operator may score the tubing with a knife and break it there. Alternating suitable cutting devices may be provided for severing the tubing completely. Where the stopper is secured in the tubing by a wire which extends rearwardly to the cap 97, such stopper will be held stationary by the wire at all times while the tubing is drawn forward over it. Thus the air pressure is maintained steady all the time.

Although with the use of accumulators such as 111 and 121, a pressure of 6500 p. s. i. is maintained at all times actually only 25 to 30 p. s. i. of oil pressure is exerted against the tubing in actual running operation. The reason for this is that only a small quantity of oil (of the order of 9 drops per minute which amount of course may be varied depending upon the size of the tubing being extruded) flows into the dies. This is sufficient to provide a thin film of oil but because the air pressure is only from 25 to 30 p. s. i. the oil pressure drops down to balance the air pressure. Thus the pressure of the oil in the conduits 113a and 132 is reduced to 25 to 30 p. s. i. as far back as the metering valves 114 and 138.

Before starting production of tubing, the barrel 27 of the extruding machine is heated by circulating hot oil to about 380° F. The offset delivery tube 41 and the main die 42 are also heated to the same temperature. Water is turned on in the cooling jacket 13. A small amount of air is caused to flow through the mandrel and a small stream of lubricating oil is turned on. The screw 25 in the extruder 11 is started. Dry plastic granules are fed into the hopper 26 and pushed through the heated extruder barrel 27. As the material nears the die end of the barrel it has reached a semi-liquid state. As the material flows through the off-set delivery block 41 around the air inlet tube 43, the spider 54 and the mandrel 56, the air pressure keeps it from collapsing entirely. However, as it slides out of the cooling tube at first it is not perfect tubing. It is then fed through the conveyor rolls. After it passes the conveyor rolls the open end is closed off. The air pressure now forces the material against the cooling die tube 76 and holds it to the shape of the cooling die tube 76, while the material moves on the film of lubricant. After the end has been sealed off, I meter down the supply of oil to the required number of drops per minute (for example, 9 drops per minute). Too much lubricant distorts the tubing and prevents rapid cooling. Should the wall be too thick, I speed up the conveyor 19. This stretches the wall thinner but leaves the outside diameter constant. Should the wall be too thin, I slow up the conveyor 19. By regulating conveyor speeds the proper wall thickness is maintained. Provision is also made to compensate for uneven walls. This is done by the six shifting screws 64, located around the die housing, which shift the collar or nozzle 51 from side to side to balance the wall.

It is to be understood that the above described embodiments of my invention are for the purpose of illustration only and various changes may be made therein without departing from the spirit and scope of my invention.

I claim:

1. Apparatus for shaping hollow plastic articles by extrusion comprising a main die block having a recess formed therein, a nozzle assembly having a supporting block positioned in said recess and having a forwardly projecting sleeve; an oil ring surrounding said sleeve and supported thereby; a mandrel positioned within said sleeve and supported by said main die block so that an annular passageway is formed between the mandrel and the sleeve through which plastic is extruded; and means for adjusting said nozzle assembly together with said oil ring relative to said main die block, and to said mandrel whereby the initial shape of outside of the hollow plastic article being formed is initially determined.

2. Apparatus for shaping plastic by extrusion comprising a plastic extruding machine by which heated plastic under pressure is extruded, a straight line assembly of an air supply tube, a main die, a spider, a mandrel, a nozzle, an oil ring and a cooling die; and an offset delivery block by means of which plastic is delivered from the extruding machine to the straight line assembly.

3. Apparatus for shaping plastic by extrusion comprising a spider, a mandrel, a nozzle, an oil ring, a cooling die and an air elbow each having a central passageway aligned with the central passageway of the others, the air elbow having a rear opening aligned with said central passageways and having a removable cap closing said opening.

4. For use in combination with apparatus for shaping plastic material by extrusion; a source of supply of lubricant under relatively high pressure; a source of supply of lubricant under relatively low pressure; a die through which plastic is extruded; conduits connecting said sources of supply of lubricant to said die; a valve in one of said conduits for reducing the amount of lubricant supplied by said low pressure supply to a rate of a relatively few drops per minute; a pressure controlled valve for normally preventing lubricant from said high pressure source from entering said conduits; and pressure controlled means for opening said pressure controlled valve under abnormal conditions when the pressure in said conduits exceeds a predetermined amount.

5. Apparatus for shaping plastic by extrusion comprising an extruding machine by which heated plastic under pressure is extruded; a delivery block having an S-shaped passageway through which the plastic extruded by the machine passes; a main die block into which plastic from the delivery block is forced; a spider formed with a central air passageway, centrally positioned in said die block and over which said plastic flows; a mandrel also formed with a central air passageway, secured to said spider, and over which said plastic flows in annular form; a cooling die into which the annulus of plastic so formed flows; an annular oil ring interposed between said main die block and said cooling die; an air pipe passing through said delivery block, through said main die block and joined to the passages formed in said spider and in said mandrel whereby air is delivered to the center of the plastic annulus as it is being extruded into said cooling die from around said mandrel; means for delivering oil under pressure on outside of said plastic annulus as it is being extruded through said oil ring, and means for supplying air to said air pipe and thus to the interior of the plastic annulus.

6. Apparatus for shaping plastic by extrusion comprising an extruding machine by which heated plastic under pressure is extruded; a delivery block having an S-shaped passageway through which the plastic extruded by the machine passes; a main die block into which plastic from the delivery block is forced; a spider formed with a central air passageway, centrally positioned in said die block and over which said plastic flows; a mandrel secured to said spider also formed with a central air passageway and over which said plastic flows in annular form; a cooling die into which the annulus of plastic so formed flows;

an air pipe passing through said delivery block, through said main die block and joined to the passages formed in said spider and in said mandrel whereby air is delivered to the center of the plastic annulus as it is being etxruded; means for supplying air to said air tube and thus to the interior of the plastic annulus; and an elbow secured to said air tube having a removable cap whereby a cleaning tool may be inserted through said air pipe, said block, said spider and said mandrel and into said cooling die.

7. Apparatus for shaping plastic by extrusion comprising an extruding machine by which heated plastic under pressure is extruded; a main die block formed with a forward recess and formed with a central passageway through which plastic from the extruding machine is forcerd; a mandrel supported by said die block and over which said plastic flows in annular form, a cooling die into which the annulus of plastic so formed flows; an annular oil ring interposed between said main die block and said cooling die; a nozzle having a support positioned in said main die block recess and having a concentric forwardly extending sleeve fitting within the opening in the oil ring and surrounding but spaced from said mandrel and thus forming an annular passageway through which the annulus of plastic flows into the cooling die, means for delivering air to the center of the plastic annulus as it is being extruded from said passageway; and means for delivering oil under pressure through said oil ring and onto the outside of said plastic annulus as it is being extruded from said passageway.

8. Apparatus for shaping plastic by extrusion comprising an extruding machine by which heated plastic under pressure is extruded; a delivery block having an S-shaped passageway through which the plastic extruded by the machine passes; a main die block into which plastic from the delivery block is forced; a spider formed with a central passageway, centrally positioned in said die block, and over which said plastic flows; a circular mandrel secured to said spider also formed with a central passageway and over which said plastic flows; a cooling die into which the annulus of plastic so formed flows; an annular oil ring interposed between said main die block and said cooling die and having two bores of slightly differing diameters, of which the forward bore is slightly larger than the rear bore; a nozzle comprising a supporting annular block and a concentric forwardly extending sleeve which is carried by said block, which fits snugly within the rearward smaller bore of the oil ring and which is spaced slightly from the forward bore whereby an annular passage is formed so that a film of oil is formed around said sleeve which is picked up by the annulus of the extruded plastic coming out of said sleeve around said mandrel; an air pipe passing through said delivery block, through said main die block and joined to the passages formed in said spider and in said mandrel; means comprising a passageway in said oil ring for delivering a ring of oil under pressure to the outside of said plastic annulus as it is being extruded into said cooling die through said oil ring; means for supplying air to said air tube whereby air is delivered to the center of the plastic annulus as it is being extruded; and an elbow secured to said air tube having a removeable cap whereby a cleaning tool may be inserted through said air pipe, said block, said spider and said mandrel and into said cooling tube; a jacket for said cooling die; means for drawing the completed annulus of plastic from said cooling die; means for varying the rate of movement of said drawing means; means for circulating a cooling medium through the jacket around the cooling die from the outer end toward the inlet end; and means for varying the pressures and rates of flow of the lubricant so that lubricant is supplied under low pressures for normal operations and under relatively high pressures for abnormal operations, said means being automatically controlled for supplying such lubricant under such high pressure when needed for the purpose of preventing jams in the apparatus.

9. Apparatus for forming an elongated hollow rigid tube from fluid plastic material having a continuous wall of predetermined inside and outside diameters comprising, in combination, an intial forming die for rough shaping the tubing, a cooling die for finishing the rough shape tubing, means for feeding said tubing from the forming die to the cooling die at a controlled and constant rate, holding means adapted to receive the finished tubing as it leaves the cooling die and which includes pulling members and means for operating said pulling members to pull the finished tubing from the cooling die at a rate which differs from the rate of feeding the rough tubing into the cooling die to control the wall thickness of the finished body.

DONALD J. WEBER.

REFERENCES CITED

The following references are of record in the file of this patent:

UNITED STATES PATENTS

| Number | Name | Date |
|---|---|---|
| 241,231 | Mayall | May 10, 1881 |
| 1,371,576 | Royle | Mar. 15, 1921 |
| 1,374,584 | Knecht | Apr. 12, 1921 |
| 1,679,545 | Roth | Aug. 7, 1928 |
| 1,876,256 | Maynard | Sept. 6, 1932 |
| 1,956,330 | Mullin | Apr. 24, 1934 |
| 2,047,554 | Fischer | July 14, 1936 |
| 2,057,467 | Williams | Oct. 13, 1936 |
| 2,121,966 | Jacobson | June 28, 1938 |
| 2,365,375 | Bailey et al. | Dec. 19, 1944 |
| 2,377,908 | Slaughter | June 12, 1945 |
| 2,378,539 | Dawihl | June 19, 1945 |
| 2,422,953 | Davies et al. | June 24, 1947 |
| 2,433,937 | Tornberg | Jan. 6, 1948 |

FOREIGN PATENTS

| Number | Country | Date |
|---|---|---|
| 343,434 | Great Britain | Feb. 9, 1931 |